United States Patent [19]
Engel

[11] 3,777,652
[45] Dec. 11, 1973

[54] DEVICE FOR PROVIDING IRISH COFFEE

[76] Inventor: Emil Engel, 8595 Waldsassen, Egerer Strasse 34, Germany

[22] Filed: Aug. 9, 1972

[21] Appl. No.: 278,942

[52] U.S. Cl. .................................. 99/275, 259/57
[51] Int. Cl. ........................ A23f 1/00, B01f 9/04
[58] Field of Search .................. 259/57, DIG. 23, 259/81, 89, 58; 99/275, 277.2, 279, 287, 288, 323, 348

[56] References Cited
UNITED STATES PATENTS

| | | | |
|---|---|---|---|
| 424,438 | 3/1890 | Stubbs | 259/57 |
| 1,723,658 | 8/1929 | Quade | 259/DIG. 23 |
| 3,194,542 | 7/1965 | Pfeifer | 259/57 |
| 3,497,183 | 2/1970 | Corey | 259/57 |

Primary Examiner—Robert W. Jenkins
Attorney—Robert K. Youtie

[57] ABSTRACT

The specification describes a device for the preparation of Irish-Coffee which comprises a number of rotary plates arranged to receive glasses in which the Irish-Coffee is made.

9 Claims, 4 Drawing Figures

DEVICE FOR PROVIDING IRISH COFFEE

BACKGROUND OF INVENTION

1. Field to which Invention Relates

The invention relates to a device for preparing or providing Irish-Coffee comprising a glass holding means with a glass support which is located over a heat source and in which a heat resistant Irish-Coffee glass can be placed so as to be capable of rotating.

In order to prepare Irish-Coffee a heat resistant glass is placed over a heat source, more particularly a spirit flame, together with whisky until it is capable of burning and together with sugar and hot coffee and the whole is then covered with a layer of whipped cream which is in a semi-solid condition. The hot alcoholic coffee drink is then sipped or drunk through the cool whipped cream.

2. The Prior Art

Frames have been previously proposed which comprise a spirit burner and above it have a support for a glass, which is arranged in an oblique position above the spirit flame, is partly filled with whisky and is then heated, while the stem or base of the glass, located outside the frame, is held and turned. This device for preparing Irish-Coffee, however, has the disadvantage that it is only possible to prepare a single glass of the beverage at one time and the attention of the operator, who must turn the stem of the glass, is occupied the whole time. In order to cater for a small party or for a restaurant the previously proposed device is therefore not suitable.

SUMMARY OF INVENTION

On the other hand one aim of the present invention is to provide a device for the simultaneous preparation of several glasses of Irish-Coffee.

In order to achieve this and other aims the invention provides that the glass holding means comprises several glass supports, whose lower rest means for the stems of the glasses are in each case respective rotatable plates which when turned entrain the glasses, and the plates of the glass rests are connected with each other in a driving manner. With this device, it is possible to turn one respective glass over the respective heat source of each glass support and the foot plate or base part of the glass is mounted in the respective plate and is entrained on rotation of it. It is possible for example to provide supports for six glasses which have combined or separate heat sources such as spirit or gas burners or, as a further possibility, infra-red heaters.

In accordance with a preferred embodiment the plates are spur gear wheels which mesh with each other and of which one is connected with an external drive, for example via a worm in engagement with a hand crank or a clockwork or electric motor. In certain circumstances it may be appropriate to include a stepdown gearing unit. The plates should rotate at a speed in the order of magnitude of about two revolutions per minute. The described arrangement makes possible an even rotation for a number of glasses and thus the simultaneous production of several portions of Irish-Coffee of uniform quality and with the same length of time for the preparation.

The size and shape of the plates, which have a cylindrical or conical recess for the feet of the glasses and possibly the external gear teeth make possible the use of plastic for the plates as a preferred feature, since owing to this it is possible to produce relatively light and cheap plates. The question of resistance to heat for the plate does not play a primary role, since the heat transferred to the liquid filled part of the glass does not make itself felt to any substantial extent at the foot of the glass.

Further points of support for the glasses are not necessary if the glasses are mounted vertically in plates rotating in horizontal planes. Such a construction is admittedly of limited applicability, since flames which are applied laterally to the standing glasses only have a slow heating effect and the sugar placed in the glass remains at the bottom of it and stirring is required to make sure that it does in fact dissolve. Preferably, therefore, the invention is applied to a device in the case of which — just as is the case with the prior art — the glass holder is so arranged that the glasses lie obliquely in the glass supports and in the case of which the flame is applied from below and owing to the tumbling movement the sugar is rapidly dissolved. In the case of such a construction the plates lie in oblique planes and for each glass at least one further rest is necessary for lateral support so as to make possible a stable positioning of the glasses and their rotation in an oblique position. For example in addition to the plates it is possible to provide for each glass three further abutments, of which one supports the stem of the glass and two abutments support the actual container part of the glass on both sides of the vertical axial plane. In the case of such a construction preferably the plates are arranged in a common plane so that their drive connection can easily be produced. In the case of an arrangement in several planes it would be necessary to use, for example, bevel gear wheels and furthermore owing to the large spacing adjacent to the glass feet or adjacent to the upper parts of the glasses much space would be wasted.

Preferably in the case of plates lying in a common plane the plates are attached to a frame of stainless steel or plastic, which carries the further abutments for the glasses and can be swung about a horizontal axis. This frame can be pivoted to and and fro between two stable positions, in which the glasses are respectively arranged obliquely over the heat sources and are vertical. The swinging back out of the oblique heating position into the upright position enables the whipped cream to be added to the glasses and is used for removal of the glasses from the device. Preferably the frame can be locked in at least its oblique position, possibly, however, also in its upright position and for this purpose an automatic or hand-operated locking device comes into question. Owing to this the danger of unintended movements of the glasses, in the case of which the contents of the glasses could be spilled over the device, is reduced.

In accordance with a simple construction which can easily be produced the tilting frame consists of punched out stainless steel sheet.

In the case of unfavourable friction at the various parts of the glass support means it may be in some cases that difficulties arise as regards the entrainment of the glasses by the slowly rotating plates. This difficulty may occur more particularly when owing to the bearing friction and the drive elasticity at some plates rotary movement in jerks occurs or when owing to paint or the like on the glasses favoring friction an increased amount of friction occurs at the resting support parts of the glass support. This problem can be overcome by making the recesses in the plates taper conically towards their bottom surfaces. Preferably the conical angle is in this case approximately 60°. This construction is suitable for glasses whose foot diameter is greater than the bottom diameter of the recess but is less than the diameter of the recess at the outer edge. Owing to the conical construction the whole periphery of the glass foot makes engagement with the rotating plate. Experience has shown that owing to this construction there are no difficulties as regards transport of the glass.

LIST OF FIGURES OF DRAWINGS

In what follows the invention will be described in detail with reference to two embodiments referring to the drawings.

DESCRIPTION OF PREFERRED EMBODIMENTS

Figure 1:
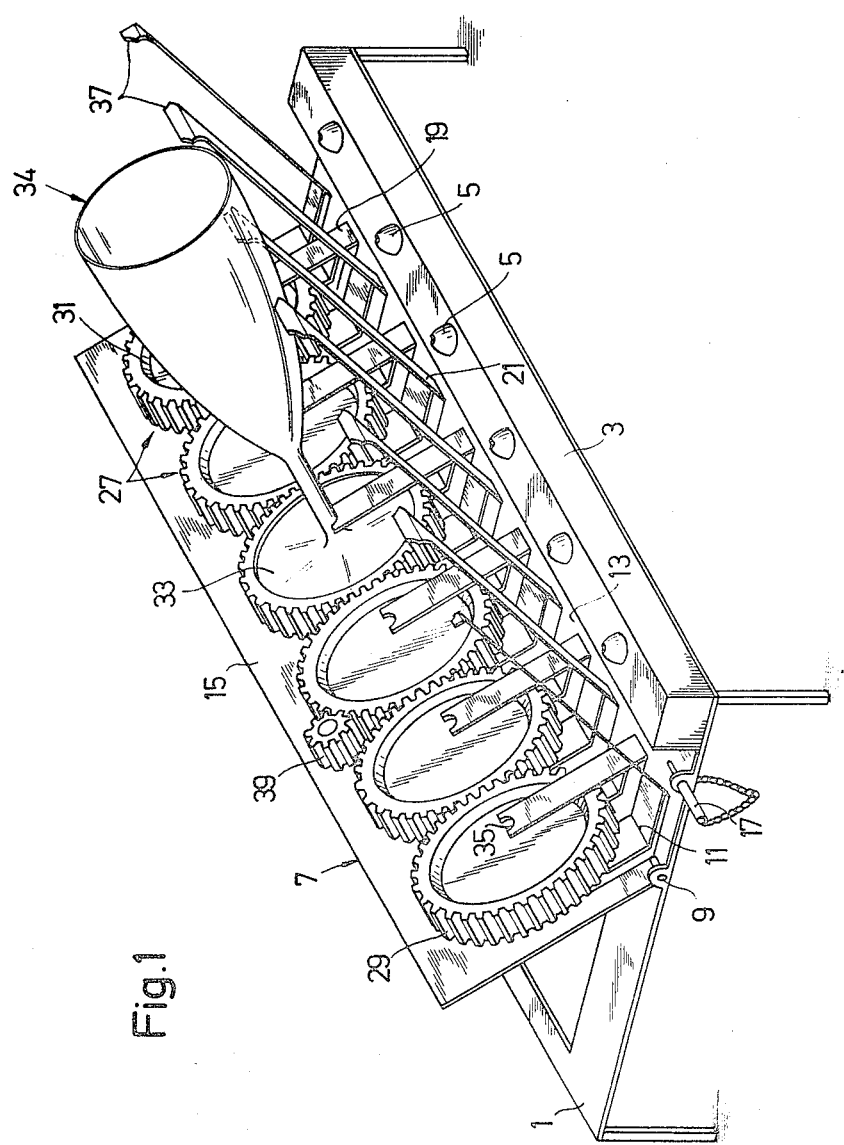
FIG. 1 is a perspective view of a device in accordance with the invention for the simultaneous preparation of six glasses of Irish-Coffee.

The device in accordance with FIG. 1 comprises a frame 1 generally in the form of a low table frame with a rectangular plan, which carries the actual parts of the device. A spirit tank 3 is fixed on the frame 1 along its longitudinal side and on its six burners 5 are arranged, that is to say one burner for each station for the preparation of Irish-Coffee.

The frame 1 furthermore carries a subframe 7, which is connected pivotally with it at 9 and can be pivoted to and fro about a horizontal axis 11 between two stable positions. The subframe 7 comprises a piece of sheet metal bend along the axis 11, which divides the piece of sheet metal into two fields 13 and 15 respectively. In the stable pivoted position shown in FIG. 1 the field 13 has its edges lying against the frame 1 and in the position shown in FIG. 2 the field 15 has its edges lying against the frame 1. Owing to a pin locking means 17 the frame 7 can be fixed in the position shown in FIG. 1.

Figure 3:
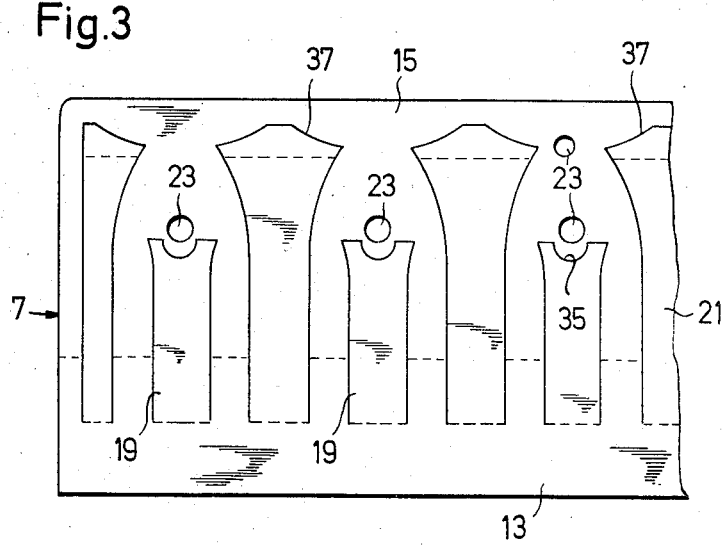
FIG. 3 shows a broken away plan view of an individual part of the device in accordance with FIG. 1 during its production.

The subframe 7 is produced from a straight plate of stainless steel in a manner shown in FIG. 3. From the plate the lugs 19 and 21, which can be bent out, are firstly so punched, that they are only connected on one side in the manner of bridge pieces with the rest of the sheet metal. Furthermore holes 23 for eventually receiving shafts 25 are drilled. By displacing the lugs on bending the sheet metal along its axis 11 and by bending the lugs 21 the form of the subframe 7 shown in FIG. 1 is obtained. The eventual bending lines are shown in FIG. 3 in broken lines.

Shafts 25 are journalled in the row of holes in the frame 7 and carry plates 27. In all the device shown comprises six plates 27, which in accordance with their position are associated with one of the burners 5. The plates 27 are constructed as spur gear wheels with external teeth 29 and the adjacent plates mesh with each other. By driving one of the plates all six plates 27 can be caused to rotate. Each of the plates 27 has a concentric recess with a conical side wall 31 for receiving respective foot plate 33 of a glass 34 with a stem.

The conical side wall 31 has a conical angle of 60°. The foot plate 33 of the glass has a diameter which lies between the bottom diameter and the external edge diameter of the recess or the conical side wall 31. Therefore its whole periphery lies against the conical side wall 31 and comes wedged fast in it.

The selected conical angle of the conical side wall 31 has a greater slope than the angle of inclination of field 7 in the position in accordance with FIG. 1. Owing to this dimensioning it is ensured that also in the position in accordance with FIG. 1 the glass does not tend to slip out of the recess in the plate 37 owing to gravity. Furthermore the filled glass 34 has its foot plate 33 pressing into the cone with a certain degree of force.

The lug 19 is cut so that on its upper side it has a notch 35 which approximately corresponds to the periphery of the glass stem and serves to ensure that the glass can be brought without much skill into the conical recess or recesses or removed from them. The lugs 21 have on both sides corner notches 37, though those at the edges only have notches on one side. Owing to a bending of the lug head upwards these notches lie opposite each other with respect to a vertical axial plane of the glass and serve as supports or rests for the container parts of the glasses 34.

The teeth 29 of one of the plates 27 are engaged by a gear wheel 39 which is connected with a step-down gearing unit 40 driven by an electric motor fixed on the bottom side of the field 15 of the subframe 7. On switching-on the electric motor owing to the step-down gearing unit and the further step-down between the gear wheel 39 and the plate 27 the speed of rotation of the plate 27 resulting is 1.9 revolutions per minute. Alternatively and/or additionally a hand crank drive can be provided and it is also convenient to provide a clockwork drive.

In operation in the position in accordance with FIG. 1 a heat resistant stem glass 34 is placed in each of the glass supports formed by the recess in the plate 27 and the notches 35 and 37, as is shown in one station in FIG. 1. The glasses are filled with whisky and some sugar and the burners 5 are lit so that the flames play round the container parts of the glasses 34. With the help of the drive all six plates 27 are caused to rotate slowly and the glasses 34 which are carried by their feet 33 engaging the conical side walls 31 of the recesses are also turned. After sufficient heating of the content of the glass so that it is flammable, the locking means 17 is undone and the frame 7 is swung into the position shown in FIG. 2, in which the heated coffee and the cold whipped cream can be placed in the glass 34, so that the glasses can now be served out.

Figure 2:
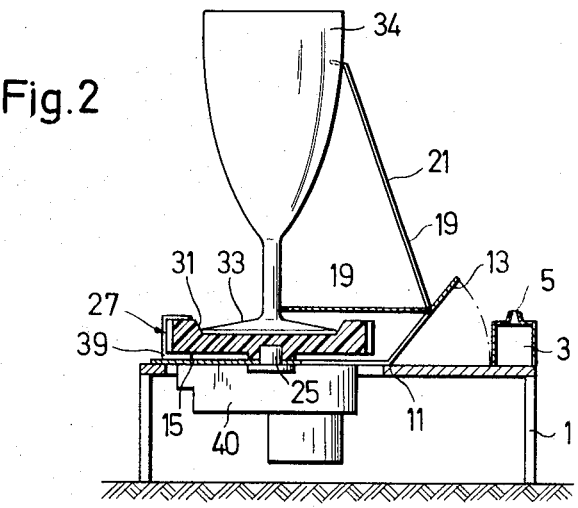
FIG. 2 shows in cross-section the device in accordance with FIG. 1 in a different working position.
Figure 4:
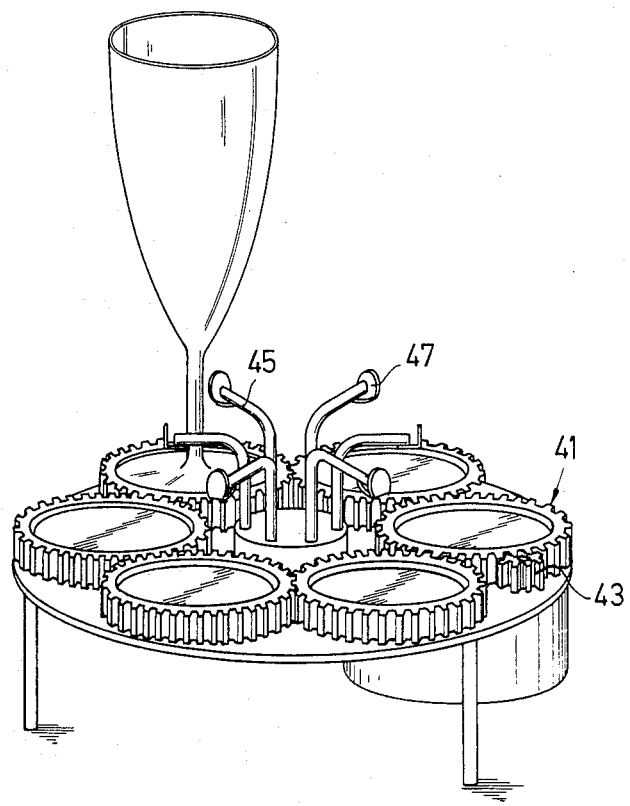
FIG. 4 is a perspective view of a modified embodiment of the invention.

FIG. 4 shows a different embodiment of the invention whose plates 41 correspond to the plates 27 in FIGS. 1 and 2. However, they are mounted on a horizontal plate in a closed hexagonal arrangement. A drive gear wheel 43 serves to provide for rotation. The glasses can only be placed in a vertical position in the plates 41. They do not need any further support means.

In the middle between the plates 41 and the glasses mounted in them a star burner 45 is arranged which passes the fuel to positions adjacent to the glasses through tubes arranged in a star formation. In front of each opening of the burner tubes a protective shield 47 is arranged which protects the thick glass parts against the flame. The flame thus plays from the side against the thin wall parts of the container of the glass, which continuously rotates in front of it. For removal of the glasses the flames are preferably extinguished.

What is claimed is:

1. A device for producing Irish coffee, which device comprises: a plurality of rotary support members operatively connected together for simultaneous rotation and each arranged with one side facing generally upwardly for supporting engagement with the base of a respective tumbler, and heating means located in operative association with each of said support members for transferring heat to the body of a respective tumbler during rotation of the latter, whereby a mixture of Irish coffee is adapted to be introduced into and prepared within the tumblers.

2. A device according to claim 1, said support members each comprising a gear wheel in meshing engagement with each other to effect said simultaneous rotation.

3. A device according to claim 2, in combination with manually actuable drive means connected to at least one of said gear wheels in driving relation therewith.

4. A device according to claim 2, in combination with electromotive drive means connected in driving relation with at least one of said gear wheels.

5. A device according to claim 1, in combination with a frictional surface on said one side of each support member for frictionally engaging the supported tumbler.

6. A device according to claim 1, in combination with cushioned surfacing means on said one side of each support member for protective supporting engagement with respective tumblers.

7. A device according to claim 1, said one side of each support member being formed with an inwardly tapering recess for enhanced frictional engagement with a received tumbler.

8. A device according to claim 1, said support members being arranged with said one sides thereof facing generally obliquely upwardly, and at least one auxiliary support associated with each support member to afford lateral supporting engagement with a respective tumbler.

9. A device according to claim 8, said support members having their one sides generally coplanar, and mounting means mounting said support members for swinging movement between said obliquely upwardly facing relation with the supported tumblers proximate to said heating means, and an additional position with said tumblers remote from said heating means.

* * * * *